US 7,076,217 B1

(12) United States Patent
Luff et al.

(10) Patent No.: US 7,076,217 B1
(45) Date of Patent: Jul. 11, 2006

(54) INTEGRATED RADIO TRANSCEIVER

(75) Inventors: Gwilym Francis Luff, Great Shelford (GB); Jerry Loraine, Cottenham (GB)

(73) Assignee: Micro Linear Corporation, San Jose, CA (US)

( * ) Notice: Subject to any disclaimer, the term of this patent is extended or adjusted under 35 U.S.C. 154(b) by 931 days.

(21) Appl. No.: 09/721,555

(22) Filed: Nov. 22, 2000

Related U.S. Application Data

(60) Provisional application No. 60/167,195, filed on Nov. 23, 1999.

(51) Int. Cl.
 *H04B 1/40* (2006.01)

(52) U.S. Cl. ............................ 455/84; 455/88; 455/75; 455/260; 455/245.2; 455/304; 455/313; 375/219; 375/260; 375/303; 375/261; 375/327; 375/329

(58) Field of Classification Search .................. 455/84, 455/85, 86, 76, 245.2, 313, 304, 260, 88, 455/83, 315, 316; 375/219, 260, 261, 295, 375/296, 329
See application file for complete search history.

(56) References Cited

U.S. PATENT DOCUMENTS

| 3,988,606 | A | 10/1976 | Eggermont | ................ | 235/156 |
| 4,029,904 | A | 6/1977 | Papeschi | ...................... | 178/88 |

(Continued)

FOREIGN PATENT DOCUMENTS

| EP | 0 344 852 A1 | 12/1989 |
| EP | 0 576 082 A1 | 12/1993 |

(Continued)

OTHER PUBLICATIONS

Hidehiko Kuroda et al., "Development of Low–Power Consumption RF/IF Single–Chip Transceiver IC for PHS," Doc. No. XP–000832839, pp. 161–167, Compound Semiconductor Device Division, NEC IC Microcomputer Systems, Ltd.
Angel Boveda et al., "GaAs Monolithic Single–Chip Transceiver," Doc. No. XP–000538492, pp. 31–34, IEEE, May 15, 1995.
Hidehiko Kuroda et al., "Development of Low–Power Consumption RF/IF Single Chip Transceiver IC for PHS", NES Res. & Develop., vol. 39, No. 2, Apr. 1998, pp. 161–167.
Angel Boveda et al., "GaAs Monolithic Single–Chip Transceiver", IEEE 1995 Microwave and Millimeter–Wave Monolithic Circuits Symposium. pp. 31–34.

*Primary Examiner*—Marceau Milord
(74) *Attorney, Agent, or Firm*—Haverstock & Owens LLP

(57) ABSTRACT

A radio transceiver comprises a reception path, a transmission path, and a frequency generator with a programmable phase lock loop. The reception path, the transmission path, and the frequency generator share a maximum amount of common circuitry to facilitate implementation of the entire radio transceiver on a single integrated circuit. The reception path includes an amplifier and a quadrature mixer for producing low intermediate frequency signals. The transmission path can be controlled by either a modulated voltage controlled transmitter or an in-phase and quadrature modulator transmitter.

25 Claims, 2 Drawing Sheets

Block Diagram of Transceiver with IQ Modulator Transmitter

U.S. PATENT DOCUMENTS

| | | | |
|---|---|---|---|
| 4,141,209 A | 2/1979 | Barnett et al. | 58/23 A |
| 4,350,957 A | 9/1982 | Miyamoto | 329/107 |
| 4,397,210 A | 8/1983 | Finch | 84/1.03 |
| 4,723,318 A | 2/1988 | Marshall | 455/109 |
| 4,737,842 A | 4/1988 | Nagasaki | 358/27 |
| 4,823,092 A | 4/1989 | Pennock | 330/253 |
| 4,839,905 A | 6/1989 | Mantovani | 375/12 |
| 4,873,702 A | 10/1989 | Chiu | 375/76 |
| 4,918,338 A | 4/1990 | Wong | 307/521 |
| 5,018,524 A | 5/1991 | Gu et al. | 128/421 |
| 5,182,477 A | 1/1993 | Yamasaki et al. | 307/494 |
| 5,222,078 A | 6/1993 | Cason et al. | 375/76 |
| 5,239,273 A | 8/1993 | Hedstrom et al. | 329/312 |
| 5,245,565 A | 9/1993 | Petersen et al. | 364/825 |
| 5,303,420 A | 4/1994 | Jang | 455/343 |
| 5,345,190 A | 9/1994 | Kaylor | 330/258 |
| 5,353,307 A | 10/1994 | Lester et al. | 375/14 |
| 5,432,779 A * | 7/1995 | Shimo et al. | 370/206 |
| 5,491,447 A | 2/1996 | Goetschel et al. | 330/254 |
| 5,625,583 A | 4/1997 | Hyatt | 365/45 |
| 5,633,896 A | 5/1997 | Carlin et al. | 375/340 |
| 5,663,989 A | 9/1997 | Fobbester | 375/344 |
| 5,680,072 A | 10/1997 | Vulih et al. | 327/554 |
| 5,734,294 A | 3/1998 | Bezzam et al. | 327/552 |
| 5,825,257 A * | 10/1998 | Klymyshyn et al. | 332/100 |
| 5,826,182 A | 10/1998 | Gilbert | 455/326 |
| 5,890,051 A * | 3/1999 | Schlang et al. | 455/76 |
| 5,894,496 A * | 4/1999 | Jones | 455/126 |
| 5,903,820 A * | 5/1999 | Hagstrom | 455/82 |
| 5,920,810 A | 7/1999 | Finol et al. | 455/313 |
| 5,936,474 A | 8/1999 | Rousselin | 331/34 |
| 5,937,335 A * | 8/1999 | Park et al. | 455/86 |
| 5,953,640 A | 9/1999 | Meador et al. | 455/73 |
| 5,960,046 A | 9/1999 | Morris et al. | 375/347 |
| 5,966,666 A * | 10/1999 | Yamaguchi et al. | 455/552.1 |
| 5,999,804 A | 12/1999 | Forgues | 455/333 |
| 6,040,731 A | 3/2000 | Chen et al. | 327/359 |
| 6,060,935 A | 5/2000 | Shulman | 327/345 |
| 6,118,811 A * | 9/2000 | Narumi et al. | 375/219 |
| 6,127,884 A * | 10/2000 | Rishi | 329/304 |
| 6,175,746 B1 | 1/2001 | Nakayama et al. | 455/552 |
| 6,226,276 B1 * | 5/2001 | Na | 370/294 |
| 6,256,511 B1 * | 7/2001 | Brown et al. | 455/552.1 |
| 6,275,101 B1 | 8/2001 | Underhill | 327/551 |
| 6,308,058 B1 | 10/2001 | Souetinov et al. | 455/326 |
| 6,313,885 B1 | 11/2001 | Patel et al. | 348/725 |
| 6,343,207 B1 * | 1/2002 | Hessel et al. | 455/86 |
| 6,370,205 B1 | 4/2002 | Lindoff et al. | 375/319 |
| 6,480,553 B1 * | 11/2002 | Ho et al. | 375/272 |
| 6,484,014 B1 * | 11/2002 | Koszarsky | 455/86 |
| 6,516,186 B1 | 2/2003 | Yamagishi et al. | 455/302 |
| 6,603,818 B1 | 8/2003 | Dress, Jr. et al. | 375/295 |

FOREIGN PATENT DOCUMENTS

| | | |
|---|---|---|
| EP | 0 660 504 A1 | 6/1995 |
| EP | 0 723 335 A1 | 7/1996 |
| EP | 0 833 482 A2 | 4/1998 |
| EP | 0 948 129 A1 | 10/1999 |
| GB | 2330 279 A | 4/1999 |

* cited by examiner

Block Diagram of Transceiver with IQ Modulator Transmitter

… … …

INTEGRATED RADIO TRANSCEIVER

RELATED APPLICATIONS

This application claims priority under 35 U.S.C. § 119(e) of the co-pending U.S. Provisional Application Ser. No. 60/167,195 filed on Nov. 23, 1999 and entitled "Integrated Radio Transceiver."

FIELD OF THE INVENTION

The present invention relates to an integrated radio transceiver. More particularly, the present invention relates to an integrated radio transceiver which maximizes the amount of common circuitry between a reception path, a transmission path and a frequency generator to increase the functionality of the transceiver with a low risk of interference.

BACKGROUND OF THE INVENTION

A radio transceiver is a radio transmitter and receiver combined in one unit and having switching capabilities for selecting either the transmitting or receiving functions. The receiver combines the frequency of the received radio input signal with the frequency of a local oscillator to convert the radio signal to an intermediate frequency (IF) signal. The IF signal is then processed, filtered, and amplified. The transmitter portion of the transceiver filters, modulates and amplifies a signal to be transmitted.

An FM receiver including a phase-quadrature polyphase IF filter is disclosed in U.S. Pat. No. 5,715,529. The FM receiver includes circuitry incorporated in the signal path for converting a single-phase signal into a pair of signals in mutual phase quadrature. The IF device comprises a polyphase IF filter incorporated in the in-phase and quadrature signal paths and has a bandpass characteristic which is symmetrical around its resonance frequency. A low distortion selection of an FM IF signal at a comparatively low intermediate frequency is easier to achieve with a polyphase filter than with a single-phase filter because the bandpass characteristic of a single-phase filter at lower values of the resonance frequency cannot be made symmetrical around the resonance frequency. In addition, the polyphase filter facilitates integration of the receiver onto a single chip since the requirement of using multiple single-phase filters is eliminated.

Signal processing within a conventional transceiver requires many components which cannot all be combined within one integrated circuit (IC). A voltage controlled oscillator (VCO) used for frequency generation is particularly difficult to implement on an IC because of the difficulty of making the VCO resonate with sufficient quality factor on the IC. Other components which cannot be implemented on the integrated circuit, such as filters and inductors, increase the cost and limit the functionality of the radio transceiver. For example, a radio transceiver with an unintegrated intermediate frequency filter can not operate beyond one intermediate frequency bandwidth. If only one bandwidth is used, the radio transceiver has either a receiver power or a performance disadvantage over multiple bandwidth implementations. This is due to the broader filter allowing the acceptance of more interference, i.e., signals entering the demodulator other than the desired signal such as signals from other transmitters and thermal noise. For broad band frequency operation, a conventional radio transceiver incorporates multiple oscillators to establish a number of different radio frequency channels resulting in a complex and costly circuit. Thus, an improved radio transceiver that can be incorporated within a single integrated circuit is desired.

SUMMARY OF THE INVENTION

A radio transceiver in accordance with the present invention comprises a reception path, a transmission path, and a frequency generator with a programmable phase lock loop having an output coupled to the reception path and the transmission path. The reception path, the transmission path, and the frequency generator share a maximum amount of common circuitry to facilitate implementation of tho entire radio transceiver on a single integrated circuit. The transmission path can be controlled by either a modulated voltage controlled transmitter or an in-phase and quadrature modulator transmitter.

The reception path includes a radio frequency amplifier for amplifying a radio frequency input signal. Two equal in-phase signals are output from the radio frequency amplifier. An in-phase and quadrature radio frequency mixer combines the in-phase signals of the radio frequency amplifier with two in-phase and quadrature signal from the frequency generator and output; in-phase and quadrature low intermediate frequency signals. The low intermediate frequency signals are input into an automatic gain control amplifier to extend the dynamic range of the low intermediate frequency signals. The signals of the reception path are then processed by a filter, an amplifier, and a demodulator prior to being received.

In accordance with one aspect of the present invention, the transmission path includes a transmission data filter and modulator for receiving data signals to be transmitted. A modulated voltage controlled oscillator receives a tuning input form a loop filter of the frequency generator and a modulation input form the transmission data filter and modulator. A programmable in-phase and quadrature divider receives a signal from the modulated voltage controlled oscillator and outputs two pairs of in-phase and quadrature signals. A transmission amplifier receive one of the signals from the divider and outputs a radio frequency signal to be transmitted. The programmable phase lock loop of the frequency generator receives another of the signals from the divider. The radio frequency mixer of the reception path receives one pair of the in-phase and quadrature signals from de divider.

In accordance with another aspect of the present invention, the transmission path of the radio transceiver comprises up-conversion mixers coupled to in-phase and quadrature signals output from the transmission data filter and modulator. The frequency generator includes a voltage controlled oscillator coupled to the output of a loop filter. A programmable divider coupled with the output of the voltage controlled oscillator causes the programmable phase lock loop to produce a constant frequency at its output. An in-phase and quadrature divider is coupled to the output of the programmable divider and generates two pairs of in-phase and quadrature modulating signals. The up-conversion mixers are coupled with one pair of the modulating signals of the divider. A summer and a transmission amplifier combine and amplify the output signal of the up-conversion mixers to produce a modulated radio frequency output signal for transmission. The radio frequency mixer of the reception path receives the other pair of modulating signals from the divider. The programmable phase lock loop of the frequency generator is coupled to one of the outputs of the divider.

DETAILED DESCRIPTION OF THE PREFERRED EMBODIMENTS

Figure 1:
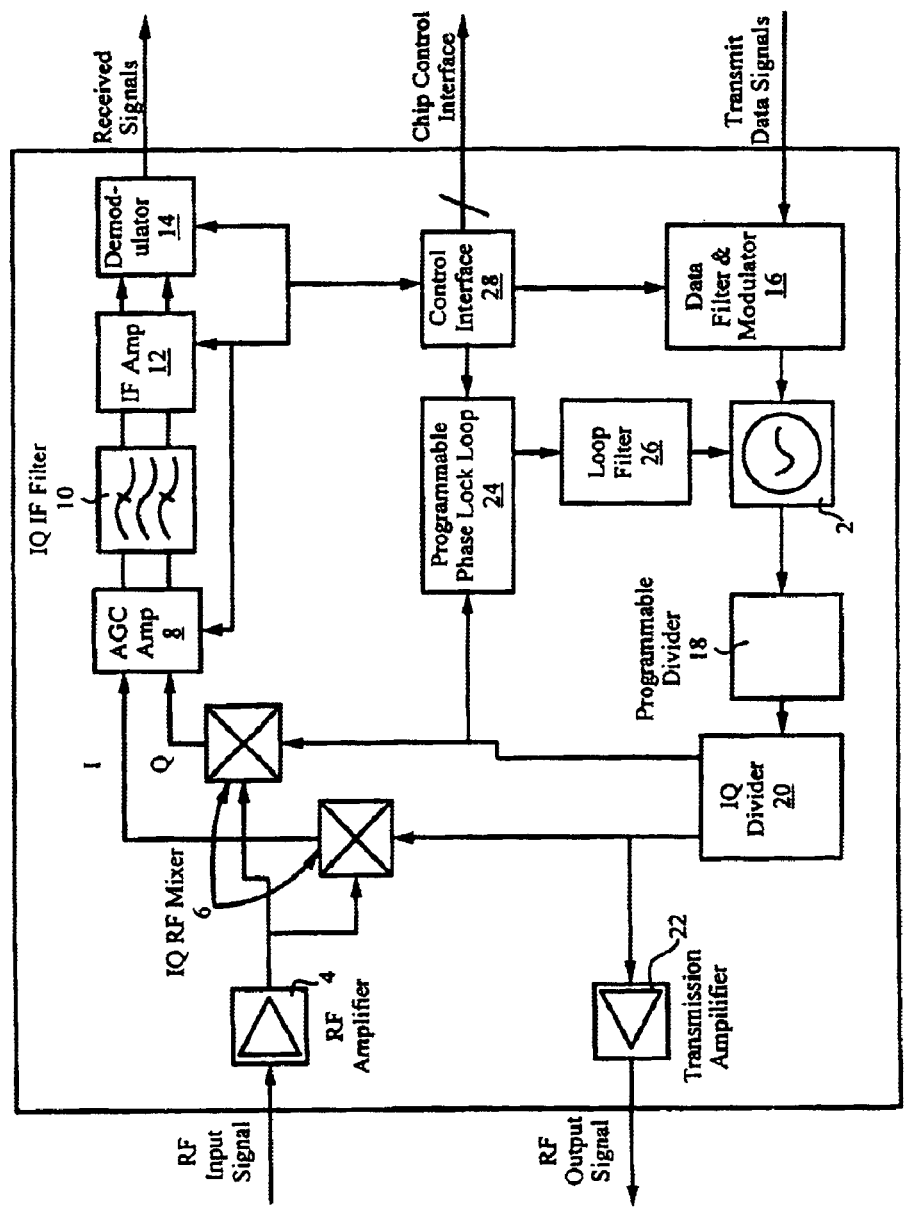
FIG. 1 illustrates a block diagram of an integrated radio transceiver including a modulated voltage controlled oscillator transmitter.

A block diagram illustrating a radio transceiver with a modulated voltage controlled oscillator (VCO) 2 transmitter implemented on a single integrated circuit (IC) in accordance with a preferred embodiment of the present invention is shown in FIG. 1. The upper portion of the diagram illustrates a reception path of the radio transceiver. The lower portion of the diagram illustrates a transmission path of the radio transceiver. The central portion of the diagram illustrates a frequency generator of the radio transceiver.

A radio frequency (RF) input signal is input into an RF amplifier 4. The output of the RF amplifier 4 is divided into two equal in-phase signals. The in-phase signals are input into an in-phase and quadrature (IQ) RF mixer 6. IQ local oscillator (LO) signals from the frequency generator are also input into the RF mixer 6. A low intermediate frequency (IF) signal is output from the RF mixer 6 and coupled to an automatic gain control (AGC) amplifier 8. The output of the AGC amplifier 8 is sent to an IQ IF filter 10. The output of the IF filter 10 is input into an IF amplifier 12 before being demodulated by a demodulator 14. The demodulator 14 outputs the signals to be received.

Data signals to be transmitted enter a transmission data filter and modulator 16. The output of the filter/modulator 16 is coupled with the input of the VCO 2. The output of the VCO 2 is fed to a programmable divider 18. The output of the programmable divider 18 is coupled to an IQ divider 20. The output of the IQ divider 20 is amplified via a transmission amplifier 22. An RF signal is output from the transmission amplifier 22.

The frequency generator of the radio transceiver comprises a programmable phase lock loop (PLL) 24 having an output coupled to a loop filter 26. The output of the loop filter 26 is fed to the input of the VCO 2. The output of the VCO 2 is coupled to the programmable divider 18. The output of the programmable divider 18 is input into the IQ divider 20. The dual outputs of the IQ divider 20 are coupled to the RF mixer 6. One of the dual outputs of the IQ divider 20 is fed back to the programmable PLL 24.

A control interface 28 is coupled with the AGC amplifier 8, the IF amplifier 12, the demodulator 14, the programmable PLL 24, and the filter/modulator 16.

The RF operating channel is determined by the VCO frequency and the division ratio provided by the dividers 18, 20. The RF input signal is amplified by the RF amplifier 4 and divided into two equal in-phase signals. The in-phase signals are coupled with the RF mixer 6 which is also fed with the IQ LO signals from the IQ divider 20. The signals output from the RF mixer 6 have a center IF frequency less than the RF channel separation frequency. Typical values for RF channel separation in digital cordless and cellular telephones are in the 100 kHz to 2 MHz range. For wireless data applications, the range could be greater than 10 MHz. The RF mixer 6 removes signals at the image frequency thereby eliminating the need for an RF filter. The signals output from the RF mixer 6 are combined in the IF filter 10. The AGC amplifier 8 between the RF mixer 6 and the IF filter 10 extends the dynamic range of the IF signal. To further increase the dynamic range of the IF signal or lower the interference sensitivity of the reception path, additional filters and amplifiers can be used.

After the IF filter 10, the IF amplifier 12 which may be a limiter or an AGC amplifier increases the IF signal level before being processed by the demodulator 14. The demodulator 14 may be a discriminator and data slicer, a discriminator with the output fed to an analog-to-digital converter (ADC) and then demodulated off the IC, digitizing the IF filter 10 outputs using ADCs then demodulating off the IC, or digitizing the IF filter 10 outputs using ADCs then demodulating on the IC. One implementation of the demodulator 14 is to integrate a pulse counting discriminator where the IF amplifier 12 comprises two identical limiter circuits. Since the output of the limiters are in phase and quadrature, an IQ circuit in the discriminator is not required. A data filter is used after the discriminator to remove the IF products and limit the noise bandwidth. A data slicer after the discriminator converts an analog signal to a digital signal. The data slicer is a comparator having a first input coupled with the output of the data filter and a second input being a time averaged version of this signal. The low IF reception path enables a reduction in RF filters and removal of conventional IF filters.

The radio transceiver of the present invention is intended for half duplex radios and receivers. Such radios and receivers cannot simultaneously receive and transmit signals. The RF input channel frequency can be either the same or different than the frequency of the transmitted output signal. The preferred radio transceiver operates on different RF channels. The operating RF is determined by the VCO 2 frequency and the division ratio of the dividers 18, 20. The VCO 2 frequency is controlled by the programmable PLL 24 which phase locks the VCO 2 to a stable reference frequency source such as a crystal oscillator. The VCO 2 is related to the reference frequency source by the division ratio. The VCO 2 receives a tuning input from the loop filter 26 and a modulation input from the transmission data filter/modulator 16. FM modulation is performed by applying a modulating voltage to the VCO 2. After the VCO 2 is modulated, either the IQ or LO signal is fed to the transmission amplifier 22. Increasing the programmable divider 18 increases the division ratio thereby enabling the VCO 2 to ensure signal isolation during transmission.

The programmable divider 18 enables the use of a single VCO 2 while allowing the radio transceiver to operate over a very wide frequency range. For cellular telephones dual radio frequency band operation is typically required at 900 MHz and 1900 MHz. These values vary depending on the government region, e.g. U.S., Europe, and Japan. Another application of the integrated radio transceiver of the present invention relates to RF reduction converters for cable, terrestrial and satellite TV services which utilize multiple VCOs for covering frequency bands between 10 MHz and 2 GHz. Since only one VCO 2 is required in the integrated radio transceiver of the present invention, the most efficient use of space on the IC is promoted.

Integration of the IF filter 10 onto a single IC enables the radio transceiver to operate at more than one IF bandwidth and can be achieved using either different IF filters 10 with different bandwidths or switching circuits within one IF filter 10 to change the bandwidth. Such a technique can be applied for both reception and transmission. This is significantly beneficial for multiple standard radios, e.g. a combined cellular and cordless telephone, which require different operational bandwidths. Generally, if only one bandwidth is used, the radio transceiver have either a receiver power or performance disadvantage over multiple bandwidth implementation since the broader filter admits more interference. For broad band frequency operation, an N value (integer number>0) of the programmable divider 18 can be selected to allow for an octave or greater operating RF range with the same VCO 2 thereby reducing circuit complexity and cost.

Automatic tuning of the IF filter 10 is achieved by generating a calibration signal at the IF center frequency using the programmable PLL 24 reference frequency. The center frequency of the IF filter 10 can be automatically adjusted when the programmable PLL 24 is locking prior to reception or transmission to remove process and temperature variations. This eliminates the need for either adjustment in the radio manufacture/test stages or the IC manufacture/test stages.

In addition to the RF transceiver circuit, high speed logic circuits could be incorporated on the IC to address other functions. The clock frequency will typically be multiples of the IF frequency, thus interference will be generated at a higher frequency than the IF frequency. This enables the integration of highly sensitive receiver circuits with logic and signal processing digital circuits.

Figure 2:
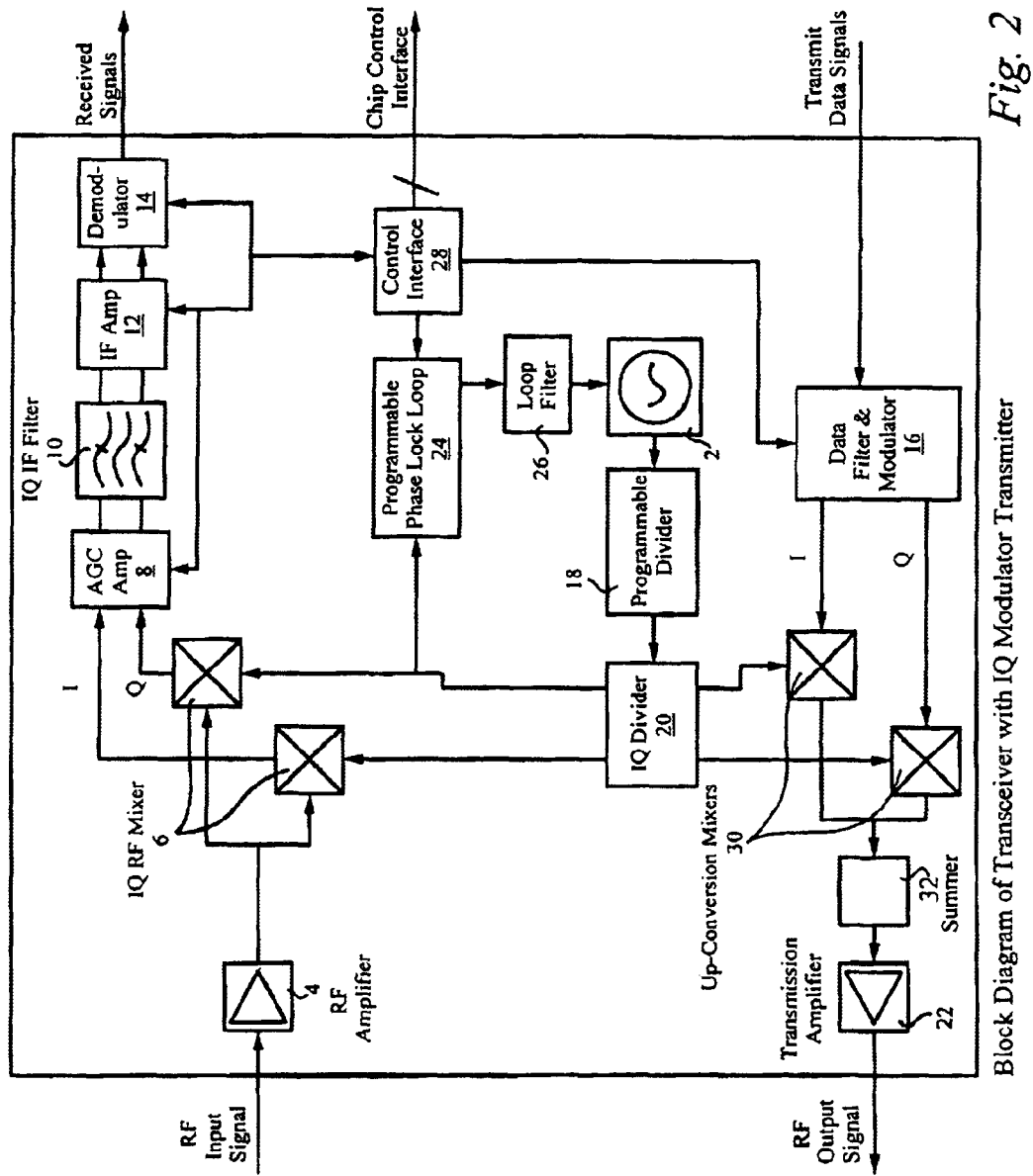
FIG. 2 illustrates a block diagram of an integrated radio transceiver including an in-phase and quadrature modulator transmitter.

FIG. 2 illustrates a block diagram of the transceiver having an IQ modulator transmitter. This configuration is essentially identical to the block diagram shown in FIG. 1 except that an alternative modulation scheme is employed where the VCO 2 frequency is not varied. The output of the loop filter 26 is the only input of VCO 2. The output of the VCO 2 is fed to the dividers 18, 20 whereby the programmable PLL 24 produces a constant frequency at its output. The IQ divider 20 generates IQ modulating signals for transmission. The data transmission signals are input into the transmission data filter/modulator 16. IQ signals are output from the filter/modulator 16 and are combined with the IQ modulating signals from the IQ divider 20 in up-conversion mixers 30. The output of the up-conversion mixers 18 are combined by a summer and amplified by the transmission amplifier 22 to produce the modulated RF output signal to be transmitted. The IQ divider 20 utilizes either a baseband modulation signal (DC signal content) or an IQ IF signal at the same frequency as the IF. For a time division duplex radio that transmits on the same RF frequency as it receives, switching the frequency of the VCO 2 between transmit and receive is not required.

The above description of the integrated radio transceiver in accordance with the present invention discloses a single programmable phase lock loop shared by both reception and transmission paths. Such a configuration allows all of the components of the radio transceiver to be integrated on a single IC which heretofore has never been accomplished. Thus, the integrated radio transceiver in accordance with the present invention is novel and unobvious and should be granted a patent on the merits.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the architecture, system and method disclosed above are only illustrative of preferred embodiments of the invention.

We claim:

1. A radio transceiver comprising:
   a reception path;
   a transmission path; and
   a frequency generator comprising a programmable phase lock loop having an output coupled to the reception path and the transmission path;
   wherein the reception path, the transmission path, and the frequency generator share a maximum amount of common circuitry to facilitate implementation of the entire radio transceiver on a single integrated circuit.

2. The radio transceiver as claimed in claim 1, wherein the reception path includes a radio frequency amplifier for amplifying a radio frequency input signal, the output of the radio frequency amplifier being divided into two equal in-phase signals.

3. The radio transceiver as claimed in claim 2, wherein the reception path includes an in-phase and quadrature radio frequency mixer for receiving the in-phase signals of the radio frequency amplifier.

4. The radio transceiver as claimed in claim 3, wherein the radio frequency mixer of the reception path receives in-phase and quadrature signals from the frequency generator and outputs in-phase and quadrature low intermediate frequency signals.

5. The radio transceiver as claimed in claim 4, wherein the reception path includes an automatic gain control amplifier receiving the low intermediate frequency signals output from the radio frequency mixer for extending the dynamic range of the intermediate frequency signals.

6. The radio transceiver as claimed in claim 5, wherein the reception path includes an in-phase and quadrature intermediate frequency filter coupled with the output of the automatic gain control amplifier.

7. The radio transceiver as claimed in claim 6, wherein the reception path includes an intermediate frequency amplifier coupled with the output of the intermediate frequency filter.

8. The radio transceiver as claimed in claim 7, wherein the reception path includes a demodulator coupled with the output of the intermediate frequency amplifier.

9. The radio transceiver as claimed in claim 1, wherein the transmission path includes a transmission data filter and modulator for receiving data signals to be transmitted.

10. The radio transceiver as claimed in claim 9, wherein the transmission path includes a modulated voltage controlled oscillator receiving a tuning input from the frequency generator and a modulation input from the transmission data filter and modulator.

11. The radio transceiver as claimed in claim 10, wherein the frequency generator includes a loop filter receiving an input signal from the programmable phase lock loop and providing the voltage controlled oscillator with the tuning input.

12. The radio transceiver as claimed in claim 10, wherein the transmission path includes a programmable divider coupled with the output of the modulated voltage controlled oscillator.

13. The radio transceiver as claimed in claim 12, wherein the transmission path includes an in-phase and quadrature divider receiving the output of the programmable divider and outputting in-phase and quadrature signals.

14. The radio transceiver as claimed in claim 13, wherein the transmission path includes a transmission amplifier receiving one signal output from the in-phase and quadrature divider, the output of the transmission amplifier being a radio frequency signal to be transmitted.

15. The radio transceiver as claimed in claim 14, wherein the programmable phase lock loop of the frequency generator receives one signal output from the in-phase and quadrature divider.

16. The radio transceiver as claimed in claim 13, wherein the radio frequency mixer of the reception path receives the in-phase and quadrature signals from the in-phase and quadrature divider.

17. The radio transceiver as claimed in claim 9, wherein the transmission path includes up-conversion mixers coupled to in-phase and quadrature signals output from the transmission data filter and modulator.

18. The radio transceiver as claimed in claim 17, wherein the frequency generator includes a loop filter receiving an input signal from the programmable phase lock loop and transmitting a signal to a voltage controlled oscillator.

19. The radio transceiver as claimed in claim 18, wherein the frequency generator includes a programmable divider coupled with the output of the voltage controlled oscillator whereby the programmable phase lock loop produces a constant frequency at its output.

20. The radio transceiver as claimed in claim 19, wherein the frequency generator includes an in-phase and quadrature divider coupled to the output of the programmable divider and generating in-phase and quadrature modulating signals for transmission.

21. The radio transceiver as claimed in claim 20, wherein the up-conversion mixers are coupled with the modulating signals of the in-phase and quadrature divider.

22. The radio transceiver as claimed in claim 21, wherein the transmission path includes a summer for combining the signal output of the up-conversion mixers.

23. The radio transceiver as claimed in claim 22, wherein the transmission path includes a transmission amplifier coupled with the output of the summer to produce the modulated radio frequency output signal for transmission.

24. The radio transceiver as claimed in claim 9, wherein the programmable phase lock loop of the frequency generator receives a signal output from the in-phase and quadrature divider.

25. The radio transceiver as claimed in claim 9, wherein the radio frequency mixer of the reception path receives output signals from the in-phase and quadrature divider.

* * * * *